(12) United States Patent
Zhou et al.

(10) Patent No.: US 12,109,642 B2
(45) Date of Patent: Oct. 8, 2024

(54) METHOD FOR RESISTANCE WELDING

(71) Applicant: Robert Bosch GmbH, Stuttgart (DE)

(72) Inventors: Baifan Zhou, Leonberg (DE); Damir Shakirov, Niefern-Oeschelbronn (DE); Fabian Bleier, Stuttgart (DE); Juergen Haeufgloeckner, Schneeberg (DE); Martin Dieterle, Ludwigsburg (DE); Sean McConnell, Hirschhorn am Neckar (DE); Sinisa Slavnic, Bremen (DE); Tim Pychynski, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 831 days.

(21) Appl. No.: 17/199,904

(22) Filed: Mar. 12, 2021

(65) Prior Publication Data

US 2021/0316388 A1    Oct. 14, 2021

(30) Foreign Application Priority Data

Apr. 14, 2020   (DE) .......................... 102020204667.0

(51) Int. Cl.
*B23K 11/25*    (2006.01)

(52) U.S. Cl.
CPC .......... *B23K 11/255* (2013.01); *B23K 11/257* (2013.01); *B23K 11/258* (2013.01)

(58) Field of Classification Search
CPC ..... B23K 11/25; B23K 11/255; B23K 11/257; B23K 11/258
USPC ....................................................... 219/110
See application file for complete search history.

(56) References Cited

U.S. PATENT DOCUMENTS

| | | | | |
|---|---|---|---|---|
| 5,819,756 A | * | 10/1998 | Mielordt ............... | A61M 15/06 131/194 |
| 6,043,449 A | * | 3/2000 | Kanjo ................... | B23K 31/12 219/109 |
| 6,703,585 B2 | * | 3/2004 | Suzuki ................. | B23K 9/0953 219/130.01 |
| 2002/0080150 A1 | * | 6/2002 | Nakatani ............... | G06F 3/0486 345/660 |
| 2013/0262000 A1 | * | 10/2013 | Hutchison ............. | B23K 9/09 702/58 |
| 2016/0214202 A1 | * | 7/2016 | Fukumoto ............. | B23K 11/34 |

(Continued)

FOREIGN PATENT DOCUMENTS

| | | |
|---|---|---|
| DE | 35 45 158 A1 | 6/1987 |
| DE | 10 2007 002 319 A1 | 7/2008 |
| DE | 20 2011 000 875 U1 | 4/2013 |

*Primary Examiner* — Jimmy Chou
(74) *Attorney, Agent, or Firm* — Maginot, Moore & Beck LLP (57) ABSTRACT

A method for resistance welding includes performing a plurality of resistance welding processes during which welding electrodes are pressed against respective welding spots of respective workpieces. The welding electrodes are energized with a respective welding current for each of the plurality of resistance welding processes, and for each of the plurality of resistance welding processes, a respective at least one characteristic value that characterizes a quality of the welding is determined. A statistical analysis of the determined at least one characteristic value for each of the plurality of resistance welding processes is performed, and based upon the analysis, an adaptation of the prescribed welding parameters is determined.

10 Claims, 3 Drawing Sheets

(56) References Cited

U.S. PATENT DOCUMENTS

2017/0032281 A1\* 2/2017 Hsu ................. G05B 19/41875
2018/0056429 A1\* 3/2018 Yoshino ................. B23K 11/24

\* cited by examiner

METHOD FOR RESISTANCE WELDING

This application claims priority under 35 U.S.C. § 119 to patent application no. DE 10 2020 204 667.0, filed on Apr. 14, 2020 in Germany, the disclosure of which is incorporated herein by reference in its entirety.

The present disclosure relates to a method for resistance welding and also to a control unit, a welding device and a computer program for carrying out said method.

BACKGROUND

Welding processes, such as for example resistance welding, can be used to connect workpieces to one another in a bonded manner. For example, in the course of automated body-in-white production using robot-controlled welding guns, various workpieces, for example metal sheets, are welded to one another by means of resistance welding.

In the course of the resistance welding, two welding electrodes of a welding gun are first pressed against a welding spot of the workpieces by way of an electrode drive in the course of what is known as a force build-up phase until a prescribed electrode force is reached. The actual welding process then takes place, in the course of which the welding electrodes are energized with a welding current for the duration of a welding time, as a result of which resistance heating of the two workpieces to be welded takes place between the welding electrodes, and the workpieces are heated until reaching a required welding temperature.

SUMMARY

Against this background, a method for resistance welding and also a control unit, a welding device and a computer program for carrying out said method with the features of the disclosure are proposed. Advantageous configurations are the subject of the disclosure and of the following description.

Within the scope of the present method, welding processes are carried out, in the course of which welding electrodes are in each case pressed against a welding spot of workpieces according to prescribed welding parameters and are energized with a welding current. Consequently, in the course of each of these welding processes, a welding spot is respectively welded.

The welding parameters represent in particular prescribed setpoint values, or a variation over time of setpoint values, according to which the respective welding process is to be carried out. The welding parameters may be in particular electrical and/or mechanical values that concern the movement or energization of the welding electrodes. For example, the welding parameters for a welding process to be carried out may be prescribed in dependence on the workpieces to be welded. In particular, the welding parameters may be stored in the form of what is known as a welding program, which is expediently executed by a corresponding welding controller.

Furthermore, in the course of these welding processes, in each case at least one characteristic value that characterizes a quality of the welding or a quality of the welding spot is determined. These characteristic values in each case describe in particular a quality of the welding spot produced and/or of the welding process carried out. These characteristic values may for example be recorded in each case by measuring instruments in the course of the respective welding process and/or be derived from measured values that have been recorded.

The determined characteristic values are statistically analyzed and, in dependence on a result of this statistical analysis, it is determined whether an adaptation of the prescribed welding parameters is to be carried out. If this is the case, future welding processes are expediently carried out with these adapted welding parameters.

Within the scope of the present method, it is consequently investigated whether the welding parameters currently being used lead to a desired quality of the welding. Should this not be the case, the welding parameters are adapted, in order to achieve a better quality of the welding in following welding processes.

The present method is based on a statistical analysis of the welded welding spots. A corresponding welding controller logs the sequence of each welding operation and the log is analyzed on a statistical basis. If an adaptation is to be carried out, in particular an adaptation of the current and force profile is calculated, and possibly also further welding parameters, and is written to or back to the controller. The controller then continues welding with the new parameters.

The statistical analysis is carried out after a number ($N \geq 1$) of welding processes which have been carried out. In particular, a statistical analysis of all of the last (for example the last M; M and N may be equal) welding processes carried out with the current prescribed welding parameters is carried out and it is checked whether an adaptation of the welding parameters is to be carried out in the controller.

If for example one or more prescribed criteria are satisfied, an adaptation is carried out. If, on the other hand, the one or more criteria is/are not satisfied, the next number of welding processes is also still carried out with the current prescribed welding parameters, expediently until such time as these criteria are satisfied. In particular, in this way a continuous analysis can be carried out.

In particular, the statistical analysis can consequently be carried out after each welding process. The number of welding processes may for example be prescribed as a fixed value or else be newly prescribed in a flexible manner, for example after each statistical analysis. If for example a comparatively strong adaptation of the welding parameters is necessary, the next number of welding parameters may be chosen to be small, in order to carry out a renewed check in a comparatively short time. If, on the other hand, only a comparatively small or no adaptation of the welding parameters is necessary, the next number of welding processes may be chosen to be higher, in order to carry out a renewed check only after a comparatively longer time.

Particularly expediently, within the scope of the present method, welding processes may consequently be carried out cyclically, wherein the prescribed number of welding processes is carried out in the course of each cycle. Consequently, in each cycle it is checked whether the adaptation of the welding parameters is to be performed, and if so the subsequent cycle is carried out with the adapted welding parameters. Similarly, it is expediently possible also to perform the check for adaptation of the welding parameters continuously after each welding process.

The welding parameters are consequently adapted continuously and dynamically to the respectively current quality of the welding. Furthermore, the adaptation takes place in particular in an automated manner, so that the welding parameters are adapted automatically and manual intervention by users is expediently not necessary. Resistance welding processes can consequently always be carried out with optimally adapted welding parameters, in order to achieve a best-possible quality of the welding.

Particularly advantageously, the at least one characteristic value that characterizes the quality of the welding characterizes welding spatter occurring during the respective welding process, in particular spattering times at which welding spatter respectively occurs during a respective welding process. Welding spatter should be understood in this connection as meaning drops of molten metal which break out as a result of the extreme intensity of heat and force that are applied to or around the welding spot. Such welding spatter may adversely influence the quality of the welding and lead to the contamination of metallic surfaces, in particular the surfaces of the workpiece and the surfaces of the welding device itself, for example the electrode caps. It is therefore important to be able to detect welding spatter precisely, in order to be able to counteract such adverse influences. The present method allows the occurrence of such welding spatter to be reduced by adaptive, automated adaptation of the welding parameters. This can expediently obviate the need for manual adaptation. Furthermore, so-called Q stops caused by excessive occurrence of spatter, that is to say stops of the line caused by quality problems, can be avoided.

Conventionally, welding programs in which welding spatter often occurs are usually manually re-parameterized, usually with a lower current at specific times in the welding sequence. Because spatter is a manifestation of material being driven out from the weld nugget, welding devices with UIR control ensure that the welding time is extended, in order to build up the weld nugget again and in order to ensure the quality of the spot. However, in this case the welding time of a spattering spot is prolonged, which can have the effect that a sequence on a production line proceeds more slowly. By contrast with this, in the course of the present method, welding spatter occurred can be detected by statistical evaluation of the characteristic value and the welding parameters can be adapted in an automated manner, in order to reduce or avoid as far as possible the occurrence of welding spatter in future welding processes. The quality and effectiveness of the welding processes carried out can in this way be increased.

Preferably, the statistical analysis is carried out in dependence on a number and/or a rate of instances of welding spatter that occur during the number of welding processes. The number and the rate of instances of welding spatter describe in particular a spattering criticality. In particular, it can first be assessed whether the number or the rate of the instances of spatter that have occurred is high enough to justify a welding parameter adaptation. If the number or the rate of instances of welding spatter that occur during the number of welding processes does not reach a respective prescribed threshold value, it can be assessed in particular that the welding parameters have been chosen well enough, so that there is scarcely any welding spatter, and that an adaptation of the welding parameters is not necessary. If, on the other hand, the number or the rate of instances of welding spatter reaches the respective threshold value, it is expediently assessed that an adaptation of the welding parameters is needed.

With preference, the statistical analysis is carried out in dependence on a statistical average value, in particular on a median of spattering times at which in each case welding spatter occurs during a respective welding process. In this way it is expediently evaluated at which times during a welding process the instances of welding spatter occur on average. For example, it can be concluded how the variation over time of setpoint values as welding parameters can be adapted in order to prevent the occurrence of welding spatter at corresponding times.

Preferably, the statistical analysis is carried out in dependence on a dispersion, in particular a variance and/or standard deviation of spattering times at which in each case welding spatter occurs during a respective welding process. The dispersion helps in particular in establishing whether welding parameters that lead to welding spatter have a consistent behavior, in order that the correct type of adaptation can be implemented. Multi-modal welding programs can lead to welding spatter at multiple times, and accordingly require more sophisticated adaptation.

Advantageously, the statistical analysis is carried out in dependence on a difference $(Øt-kσ)$ of the median $Øt$ of the spattering times and a product of the standard deviation $σ$ of the spattering times and a prescribable constant k. This difference $(Øt-kσ)$ represents a particularly expedient assessment variable, on the basis of which the adaptation of the welding parameters can be carried out. The value of the constants k may be selected expediently, for example by a user itself. If for example $(Øt-kσ)$ lies in a so-called pre-phase of the energization of the welding electrodes, the welding current strength may for example be reduced in a time range from the beginning of the welding process to the spattering time plus k times the standard deviation or to the end of a first sequence block or welding block. If $(Øt-kσ)$ for example lies after the pre-phase, a negative ramp may for example be added to the existing current parameterization.

With preference, the statistical analysis is carried out in dependence on a check, in particular a chi-square test, as to whether an occurrence of welding spatter during the number of welding processes corresponds to a random distribution. In particular, it is statistically established in the course of this check whether the occurrence of spatter has a sufficient random distribution. This check can in particular eliminate the possibility that welding parameters are incorrectly adapted. In particular, it is checked whether the occurrence of spatter is randomly distributed over all welding spots that are welded with the welding parameters, or whether a systematic frequency or recurrence of multiple instances of welding spatter exists. A positive check means in particular that the occurrence of spatter is distributed sufficiently randomly and that an adaptation of the welding parameters should be performed. A negative check indicates in particular that the welding parameters are in order, but have possibly been used for a wrong application. In this case, in particular no adaptation of the welding parameters is performed.

Advantageously, the statistical analysis is also carried out in dependence on a material of the workpieces and/or on properties of the welding electrodes. Expediently, the material to be welded and the welding electrodes themselves are consequently taken into account in the course of the analysis, since they can have an effect on the occurrence of welding spatter. In particular, the sequence of each welding operation is logged, expediently with the corresponding statistical variables, and the corresponding log is analyzed on a statistical basis according to each combination of material, welding gun, welding program and spattering time.

With particular preference, the prescribed welding parameters comprise an electrode force and/or a welding current and/or a welding voltage and/or a welding time and/or a variation over time of an electrode force and/or a variation over time of a welding current strength and/or a variation over time of a welding voltage. The welding parameters to be adapted consequently concern mechanical and electrical variables or their variations over time.

Particularly advantageously, the method is suitable for body-in-white production, in particular for automated welding processes in body-in-white production, preferably in the course of motor vehicle production. In particular, metal sheets are thereby welded to one another, in order to manufacture the body of a motor vehicle. In the course of the process of manufacturing a single body, up to several thousand welding spots may be processed in an automated manner (for example about 5000 welding spots for a mid-range vehicle). The method allows the individual welding spots to be welded with the best-possible quality.

A control unit (computing unit) according to the disclosure, for example a welding controller of a welding device, is configured, in particular in terms of its programming, so as to carry out a method according to the disclosure. The control unit or welding controller may be designed for example as a PLC (programmable logic controller), as an NC (numerical controller) or as a CNC (computerized numerical controller).

A welding device according to the disclosure for resistance welding has in particular a welding gun with welding electrodes and an electrode drive for moving the welding electrodes. In particular, a robot may also be provided, in order to activate the welding gun, for example in the case of a pneumatic welding gun. The welding device furthermore comprises a preferred configuration of a control unit according to the disclosure.

It is also advantageous to implement a method according to the disclosure in the form of a computer program or a computer program product with program code for carrying out all of the method steps, since in particular this causes low costs, in particular when an executing controller is also used for other tasks and is therefore present in any case. Suitable data carriers for providing the computer program are in particular magnetic, optical and electrical memories, such as for example hard disks, flash memories, EEPROMs, DVDs and the like. It is also possible to download a program via computer networks (Internet, Intranet etc.).

Further advantages and configurations of the disclosure become apparent from the description and the attached drawing.

It goes without saying that the features mentioned above and the features yet to be mentioned below are able to be used not only in the respectively specified combination but also in other combinations or on their own without departing from the scope of the present disclosure.

The disclosure is illustrated schematically on the basis of exemplary embodiments in the drawing and is described in detail below with reference to the drawing.

DETAILED DESCRIPTION

Figure 1:
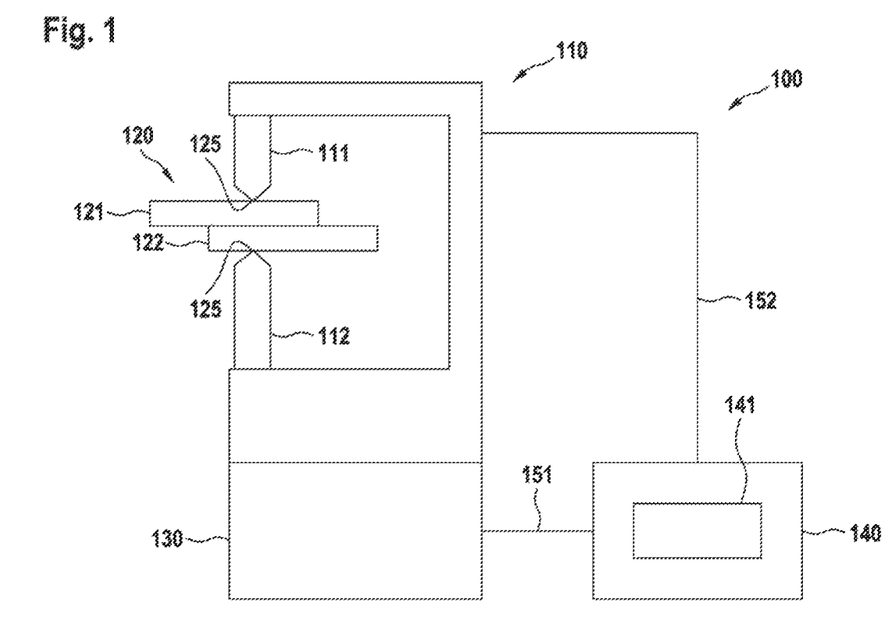
FIG. 1 schematically shows a preferred configuration of a welding device according to the disclosure which is configured to carry out a preferred embodiment of a method according to the disclosure.

In FIG. 1, a welding device for resistance welding is schematically illustrated and is denoted by 100.

The welding device 100 is able to connect workpieces 120 to one another in a bonded manner by resistance welding. The workpieces 120 are in particular welded to one another in the course of body-in-white production, wherein in particular a body of a motor vehicle is manufactured. For example, two metal sheets 121 and 122 of aluminum are welded to one another here as workpieces.

The welding device 100 has a welding gun 110 with two welding electrodes 111 and 112. An electrode drive 130 is provided in order to move the welding electrodes 111, 112. In FIG. 1, the welding gun 110 is illustrated for example as a servo-electric welding gun with an electrode drive 130 designed as a servo-motor. It is similarly conceivable that the electrode drive 130 may be designed for example as an electric motor, hydraulic motor or pneumatic motor.

In the course of the resistance welding process, the welding electrodes 111 and 112 are pressed with an electrode force against the metal sheets 121 and 122 at a welding spot 125 by way of the electrode drive 130 during what is known as a force build-up phase. The welding electrodes 111 and 112 are then energized with a welding current during the actual welding process for the duration of a welding time, as a result of which resistance heating of the metal sheets 121 and 122 takes place at the welding spot 125 and the surface of the workpieces 121, 122 is liquefied.

The welding device 100 furthermore has a control unit (welding controller) 140 which may be designed for example as a PLC (programmable logic controller). The control unit 140 is configured so as to activate the electrode drive 130 and the welding gun 110, indicated by the reference signs 151 and 152, and in order thereby to control the welding process. For this purpose, a corresponding control program or welding program 141 is executed in the control unit 140 and used to activate the electrode drive 130 and welding gun 110 according to prescribed welding parameters. These welding parameters may for example comprise a variation over time of an electrode force and a welding current.

Figure 2:
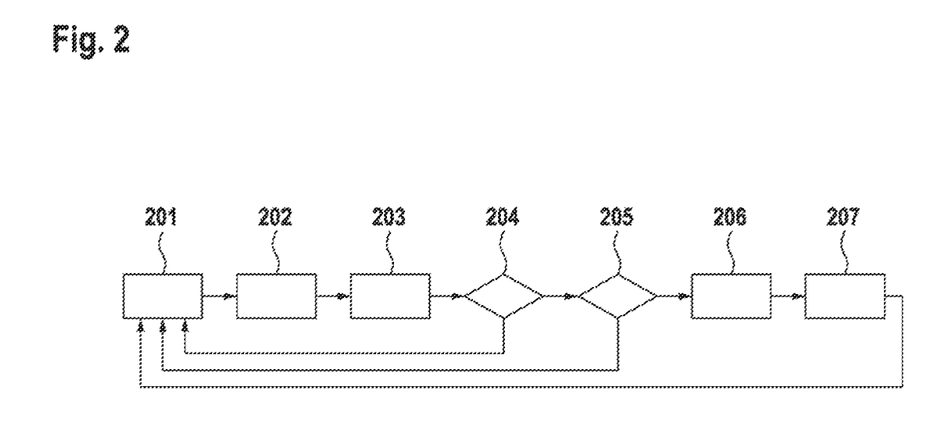
FIG. 2 schematically shows a preferred embodiment of a method according to the disclosure as a block diagram.

The control unit 140 is also configured to analyze a quality of the welding processes carried out or the welding spots 125 produced and, in the event of insufficient quality, to adapt the welding parameters correspondingly. For this purpose, the control unit 140 is configured, in particular in terms of programming, so as to carry out a preferred embodiment of a method according to the disclosure, which is schematically illustrated in FIG. 2 as a block diagram and is explained below with reference to FIGS. 1 and 2.

According to a preferred embodiment, welding processes are carried out cyclically. In the course of each cycle, in each case a prescribed number of welding processes is carried out and statistically analyzed. In dependence on this analysis, the welding parameters are adapted if need be and the subsequent cycle is carried out with the adapted welding parameters.

In a step 201, the corresponding prescribed number of welding processes is carried out, wherein, in the course of each of these welding processes, the welding electrodes 111, 112 are in each case pressed against a welding spot 125 of workpieces 121, 122 according to the prescribed welding parameters and are energized with a welding current. For example, 1000-2000 welding processes may be carried out.

Furthermore, according to step 202, in the course of each of these welding processes, in each case at least one characteristic value that characterizes a quality of the welding is determined. These characteristic values characterize in particular welding spatter occurring during the respective welding process. For example, spattering times at which welding spatter respectively occurs during a respective welding process are determined as characteristic values. Once the prescribed number of welding processes has been carried out, the determined characteristic values, that is to say the determined spattering times, are statistically analyzed.

In particular, first, in step 203, the number and the rate of instances of welding spatter during the number of welding processes are determined. In step 204, it is checked whether the number and the rate respectively reach a prescribed threshold value. If this is not the case, this indicates that the welding parameters have been chosen sufficiently well, so that there is only very little welding spatter. In this case, no adaptation of the welding parameters is performed and the next number of welding processes is carried out with unchanged welding parameters.

If, on the other hand, the number of instances of welding spatter or the rate of instances of welding spatter respectively reaches the prescribed threshold value, this indicates that a spattering criticality is exceeded and that an adaptation of the welding parameters should be performed in order to reduce the occurrence of welding spatter.

In this case, in step 205, a check is carried out as to whether the occurrence of welding spatter corresponds to a random distribution. In particular, for this purpose a chi-square test is carried out. This check is intended to eliminate the possibility that the welding program is chosen incorrectly for a welding parameter adaptation. For this purpose, it is checked whether the occurrence of spatter is randomly distributed over all welding spots that have been welded with this welding program, or whether a systematic frequency or recurrence of multiple instances of welding spatter exists.

A negative check indicates that the parameterization of the welding program is in order, but has possibly been used for the wrong application. In this case, no adaptation of the welding parameters is performed, but the program is expediently changed. A positive check, on the other hand, means that the occurrence of spatter is distributed sufficiently randomly. In this case, an adaptation of the welding parameters is performed.

For this purpose, in step 206, the median Øt and also the standard deviation a of the spattering times are determined from the determined characteristic values, that is to say from the spattering times. In dependence on a difference (Øt−kσ) of the median and a product of the standard deviation and a prescribable constant k, it is determined in step 207 how the welding parameters are adapted in order to reduce the occurrence of welding spatter in subsequent welding processes.

With these adapted welding parameters, the prescribed number of welding processes is carried out once again. The welding parameters are consequently adapted continuously and dynamically to the respectively current quality of the welding. This adaptation takes place particularly expediently in an automated manner, without manual intervention by users.

According to a preferred embodiment, it is also possible to carry out the statistical analysis after each welding process. Also in this case, in the course of each welding process, in each case at least one characteristic value that characterizes a quality of the welding is determined. In particular, the spattering times at which welding spatter respectively occurs are determined as this characteristic value, as explained above with reference to step 202. In particular, in this case the check explained above according to steps 203 to 207 is carried out after each welding process. After each welding process, according to step 203, the number and the rate of the instances of welding spatter that have occurred during the welding processes that have been carried out, which have expediently been carried out with the same welding parameters, are determined. As explained with reference to step 204, it is checked whether the number and the rate respectively reach a prescribed threshold value. If this is not the case, the next welding process is carried out with unchanged welding parameters. If, on the other hand, this is the case, according to step 205, a chi-square test is carried out. In the case of a negative check, in particular the program is changed; in the case of a positive check, an adaptation of the welding parameters is expediently performed, in particular as explained above according to steps 206 and 207. The next welding process is carried out with these adapted welding parameters.

Figure 3:
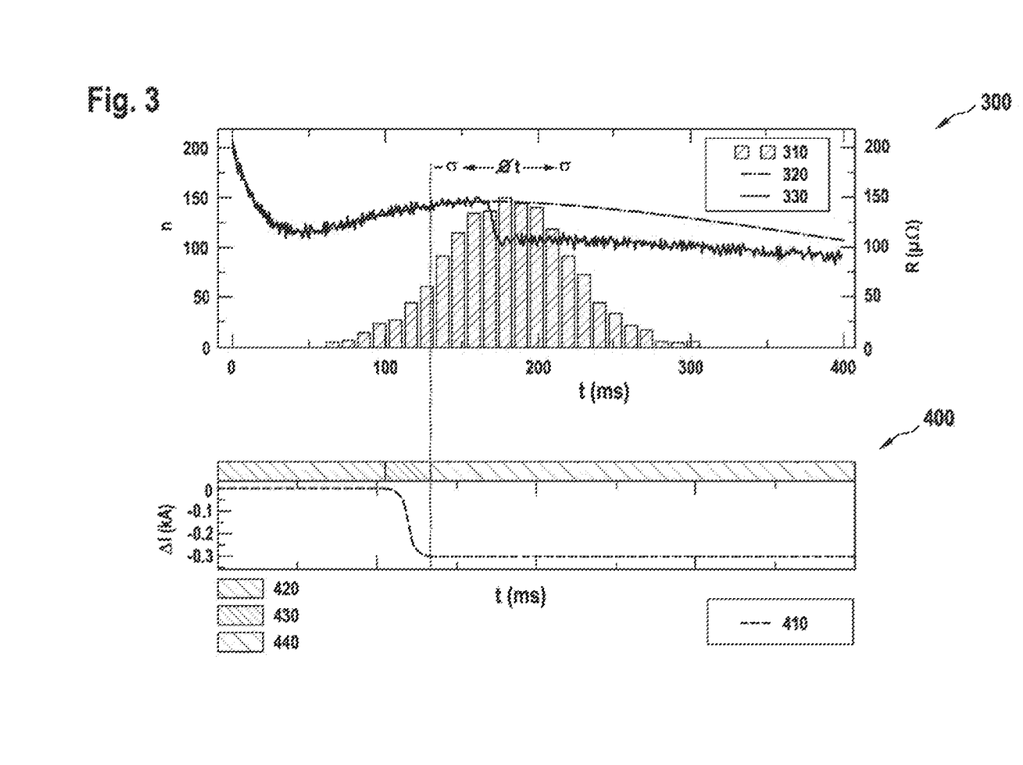
FIG. 3 schematically shows variations over time of a number of instances of welding spatter, a welding resistance and a current value, which can be used as a basis for a preferred embodiment of a method according to the disclosure.

FIG. 3 schematically shows variations over time of variables that can be used as a basis for a preferred embodiment of the method according to the disclosure.

In a diagram 300, the number n of instances of welding spatter that occur during a cycle of welding processes is plotted against the time period t of the respective welding processes. The bars 310 respectively represent a number of instances of welding spatter that have occurred in each case at a specific time during the respective welding process.

Furthermore, in the diagram 300, a welding resistance R is plotted against the time period t. Curve 320 represents a reference curve for the welding resistance in the case of a welding process with a high quality of the welding, in which no welding spatter occurs. Curve 330, on the other hand, represents the welding resistance in the case of a welding process with welding spatter.

Furthermore, in diagram 300, an interval between the values (Øt−kσ) and (Øt+kσ) is shown, where Øt is the median of the spattering times, α is the standard deviation of the spattering times and the value one has been chosen for the constant k.

As explained above, it is determined in dependence on the variable (Øt−kσ) how the welding parameters are adapted for the next cycle of welding processes. If, for example, as shown in FIG. 3, the value of the assessment variable (Øt−kσ) lies in a so-called pre-phase during the first 150 ms of the welding process, the welding current strength is reduced, as shown in the diagram 400.

In diagram 400, a current value ΔI, by which the welding current strength as a welding parameter is reduced, is plotted against the time period t of the welding process. Curve 410 represents the variation over time of this current value. During a phase 420, no adaptation of the welding current strength takes place. In the phase 430, the welding current strength is reduced and, in the phase 440, the welding process is continued with the correspondingly reduced welding current strength.

Alternatively, it is provided that a regression model is used, in order to predict the probability and also the time of the occurrence of an instance of welding spatter for a next welding spot to be welded. If the probability estimated by the regression model for the occurrence of spatter for the next welding operation lies above a limit value defined by the user, an adaptation of the welding parameters is automatically performed for the next spot. In this way, many parameters can be adapted in order to preclude spatter without restricting the quality of the spot.

The regression model is based in particular on recurrent neural networks, and itself detects which of the input variables are to be taken into account with regard to their output/target values. All of the logged data from the welding controller can be fed to the model, for example time series from reference and/or actual curves, welding parameters used for welding operation and derived data such as the time period between the individual welding operations. Outputs of the model could be the spatter probability and spattering time, from which a gradient with respect to the input variables can be formed. With this gradient, the parameters can be automatically adapted, in order to minimize the probability of the occurrence of spatter.

What is claimed is:

1. A method for resistance welding, comprising:
performing a plurality of resistance welding processes;
pressing, during each of the plurality of resistance welding processes, welding electrodes against a respective welding spot of respective workpieces based upon respective prescribed welding parameters;
energizing the welding electrodes with a respective welding current for each of the plurality of resistance welding processes;
determining, for each of the plurality of resistance welding processes, a respective at least one characteristic value that characterizes a quality of the welding;
performing a statistical analysis of the determined at least one characteristic value for each of the plurality of resistance welding processes; and
determining, based upon the analysis, an adaptation of the prescribed welding parameters,
wherein the performing of the statistical analysis is performed based upon a median of spattering times at which welding spatter occurs during each of the plurality of resistance welding processes,
wherein the performing of the statistical analysis is performed based upon a dispersion of spattering times at which welding spatter occurs during each of the plurality of resistance welding processes, and
wherein the performing of the statistical analysis is performed based upon a difference of the median of the spattering times, and a product of a standard deviation of the spattering times at which welding spatter occurs during each of the plurality of resistance welding processes and a prescribable constant.

2. The method according to claim 1, wherein the respective at least one characteristic value characterizes welding spatter spattering times at which welding spatter respectively occurs during the plurality of resistance welding processes.

3. The method according to claim 1, wherein the performing of the statistical analysis is performed based upon a chi-square test, as to whether an occurrence of welding spatter during each of the plurality of resistance welding processes corresponds to a random distribution.

4. The method according to claim 1, wherein the performing of the statistical analysis is performed based upon at least one of a material of the respective workpieces, and properties of the welding electrodes.

5. The method according to claim 1, wherein the respective prescribed welding parameters comprise one or more of the parameters consisting of:
an electrode force;
a welding current;
a welding voltage;
a welding time;
a variation over time of an electrode force;
a variation over time of a welding current strength; and
a variation over time of a welding voltage.

6. The method of claim 1, wherein a control unit is configured to:
perform the plurality of resistance welding processes;
press, during each of the plurality of resistance welding processes, welding electrodes against the respective welding spot of respective workpieces based upon respective prescribed welding parameters;
energize the welding electrodes with the respective welding current for each of the plurality of resistance welding processes;
determine, for each of the plurality of resistance welding processes, the respective at least one characteristic value that characterizes the quality of the welding;
perform the statistical analysis of the determined at least one characteristic value for each of the plurality of resistance welding processes; and
determine, based upon the analysis, the adaptation of the prescribed welding parameters.

7. A method for resistance welding, comprising:
performing a plurality of resistance welding processes;
pressing, during each of the plurality of resistance welding processes, welding electrodes against a respective welding spot of respective workpieces based upon respective prescribed welding parameters;
energizing the welding electrodes with a respective welding current for each of the plurality of resistance welding processes;
determining, for each of the plurality of resistance welding processes, a respective at least one characteristic value that characterizes a quality of the welding;
performing a statistical analysis of the determined at least one characteristic value for each of the plurality of resistance welding processes; and
determining, based upon the analysis, an adaptation of the prescribed welding parameters,
wherein the performing of the statistical analysis is performed based upon at least one of a number and a rate of instances of welding spatter that occur during the plurality of resistance welding processes.

8. A welding device, comprising:
a control unit configured to
perform a plurality of resistance welding processes,
press, during each of the plurality of resistance welding processes, welding electrodes against a respective welding spot of respective workpieces based upon respective prescribed welding parameters,
energize the welding electrodes with a respective welding current for each of the plurality of resistance welding processes,
determine, for each of the plurality of resistance welding processes, a respective at least one characteristic value that characterizes a quality of the welding,
perform a statistical analysis of the determined at least one characteristic value for each of the plurality of resistance welding processes, and
determine, based upon the analysis, an adaptation of the prescribed welding parameters,
wherein the performing of the statistical analysis is performed based upon a median of spattering times at which welding spatter occurs during each of the plurality of resistance welding processes,
wherein the performing of the statistical analysis is performed based upon a dispersion of spattering times at which welding spatter occurs during each of the plurality of resistance welding processes, and
wherein the performing of the statistical analysis is performed based upon a difference of the median of the spattering times, and a product of a standard deviation of the spattering times at which welding spatter occurs during each of the plurality of resistance welding processes and a prescribable constant.

9. The welding device of claim 8, wherein the control unit is configured by executing a computer program.

10. The welding device of claim 9, wherein the computer program is stored on a machine-readable storage medium.

\* \* \* \* \*